(12) United States Patent
Jiang et al.

(10) Patent No.: US 10,810,760 B2
(45) Date of Patent: Oct. 20, 2020

(54) CARGO-CARRYING SYSTEM, APPARATUS, AND METHOD FOR DETECTING FAILURE THEREOF

(71) Applicant: Wiwynn Corporation, New Taipei (TW)

(72) Inventors: Jheng Ying Jiang, New Taipei (TW); Geng Ting Liu, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 96 days.

(21) Appl. No.: 16/352,634

(22) Filed: Mar. 13, 2019

(65) Prior Publication Data
US 2020/0184676 A1    Jun. 11, 2020

(30) Foreign Application Priority Data
Dec. 6, 2018    (TW) .............................. 107143815 A

(51) Int. Cl.
*G06T 7/73*    (2017.01)
*F16F 15/08*    (2006.01)

(52) U.S. Cl.
CPC ................ *G06T 7/74* (2017.01); *F16F 15/08* (2013.01); *F16F 2230/0047* (2013.01)

(58) Field of Classification Search
CPC ......... G06T 7/0004; G06T 7/001; G06T 7/60; G06T 7/62; G06T 7/70; G06T 7/73; G06T 7/74; G06K 2019/06253; F16F 7/12; F16F 15/08; F16F 2230/0047; G01B 11/022; G01B 11/16; G01L 19/06; G01L 19/0618
See application file for complete search history.

(56) References Cited

U.S. PATENT DOCUMENTS

| | | | |
|---|---|---|---|
| 2017/0124367 A1* | 5/2017 | Margalit et al. | .......... G06T 7/75 |
| 2018/0216929 A1* | 8/2018 | Hoehl et al. | ........... G02B 27/10 |
| 2019/0120723 A1* | 4/2019 | Ebe et al. | ............... B60C 23/06 |
| 2019/0242693 A1* | 8/2019 | Noda et al. | ............... G06K 9/40 |

FOREIGN PATENT DOCUMENTS

TW    200535057 A    11/2005    ............. B65D 19/22

* cited by examiner

*Primary Examiner* — Andrew W Johns

(57) ABSTRACT

A cargo-carrying apparatus is provided. The cargo-carrying apparatus includes: an upper deck and a vibration-isolation section. The upper deck is configured to carry cargo. The vibration-isolation section is disposed beneath the upper deck. The vibration-isolation section includes an elastic vibration-isolation layer and one or more indicator components, and the one or more indicator components are disposed on one or more side surfaces of the elastic vibration-isolation layer, and height of the one or more indicator components varies depending on thickness of the elastic vibration-isolation layer. It is determined whether the elastic vibration-isolation layer of the cargo-carrying apparatus is invalid according to a compression ratio of the elastic vibration-isolation layer obtained from an indicator-component image of one of the one or more indicator components.

20 Claims, 12 Drawing Sheets

132A

132A

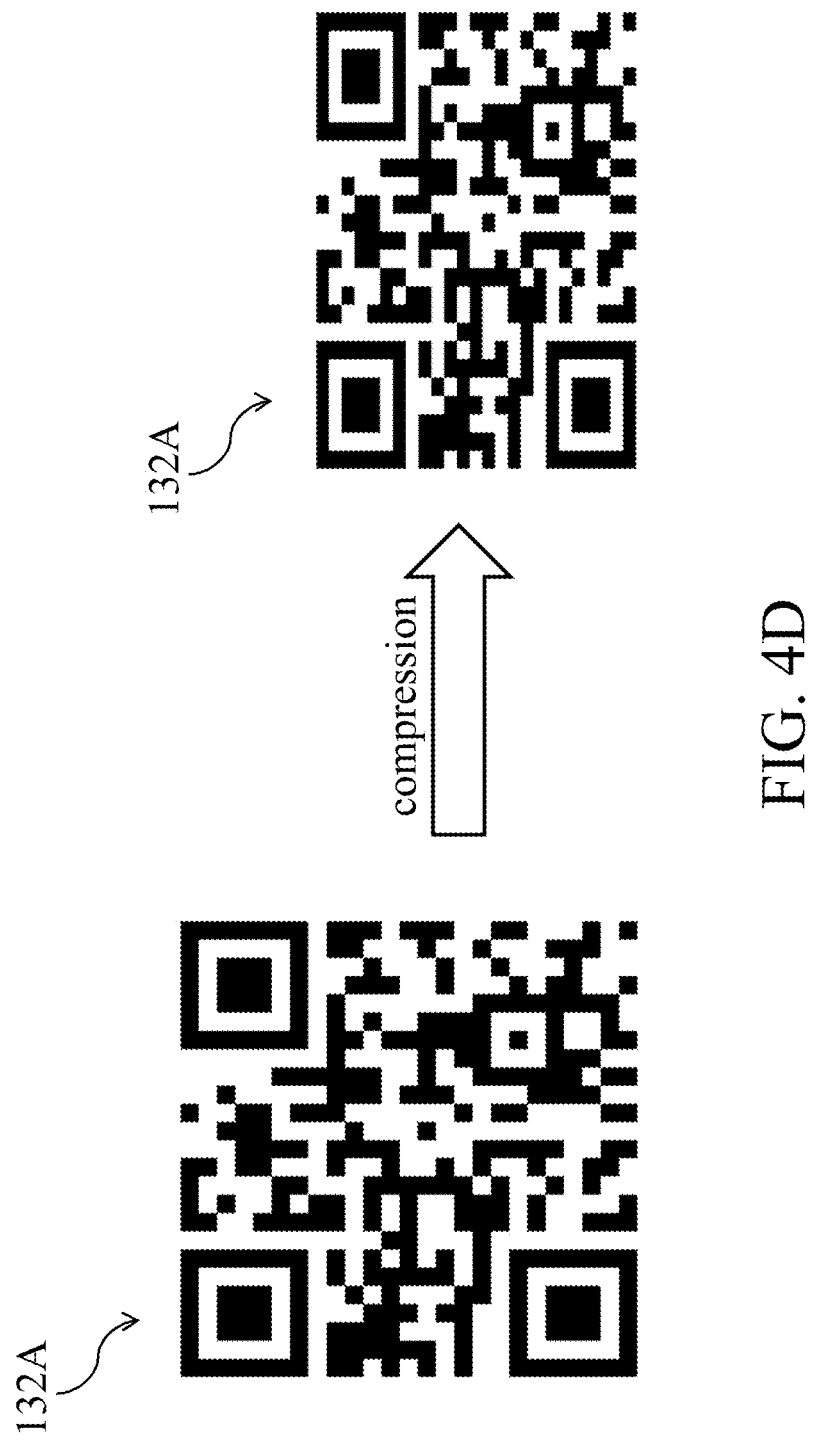

CARGO-CARRYING SYSTEM, APPARATUS, AND METHOD FOR DETECTING FAILURE THEREOF

CROSS REFERENCE TO RELATED APPLICATIONS

This Application claims priority of Taiwan Patent Application No. 107143815 filed on Dec. 6, 2018, the entirety of which is incorporated by reference herein.

BACKGROUND OF THE DISCLOSURE

Field of the Disclosure

The disclosure relates to cargo-carrying systems, and, in particular, to a cargo-carrying system, a cargo-carrying apparatus, and a method for detecting failure thereof.

Description of the Related Art

Vibration-isolation pallets that carry precision instruments have a special vibration-isolation design, and because of this design, the cost of the vibration-isolation pallets can account for a considerable proportion of the cost of goods. In order to reduce costs, conventional vibration-isolation pallets are often recycled. However, the vibration-isolation capability of the vibration-isolation layer of the vibration-isolation pallet is often reduced after each transportation process. However, the conventional method is to determine whether the vibration-isolation pallet has been damaged through manual inspection, and this method is a subjective determination. Thus, it is impossible to ensure whether the vibration-isolation layer of the vibration-isolation pallet can be recycled. If a vibration-isolation pallet that has lost its vibration-isolation capability is used, the precision instrument carried is likely to be damaged during transportation.

Accordingly, it is a crucial topic to recycle the vibration-isolation pallet and reuse it under the premise of ensuring the vibration-isolation capability.

BRIEF SUMMARY OF THE DISCLOSURE

A detailed description is given in the following embodiments with reference to the accompanying drawings.

In an exemplary embodiment, a cargo-carrying apparatus is provided. The cargo-carrying apparatus includes: an upper deck and a vibration-isolation section. The upper deck is configured to carry a cargo. The vibration-isolation section is disposed beneath the upper deck. The vibration-isolation section includes an elastic vibration-isolation layer and one or more indicator components, and the one or more indicator components are disposed on one or more side surfaces of the elastic vibration-isolation layer, and height of the one or more indicator components varies depending on thickness of the elastic vibration-isolation layer. It is determined whether the elastic vibration-isolation layer of the cargo-carrying apparatus is invalid according to a compression ratio of the elastic vibration-isolation layer obtained from an indicator-component image of one of the one or more indicator components.

In another exemplary embodiment, a cargo-carrying system is provided. The cargo-carrying system includes: a cargo-carrying apparatus and a server. The cargo-carrying apparatus includes: an upper deck and a vibration-isolation section. The upper deck is configured to carry cargo. The vibration-isolation section is disposed beneath the upper deck, wherein the vibration-isolation section comprises an elastic vibration-isolation layer and one or more indicator components, and the one or more indicator components are disposed on one or more side surfaces of the elastic vibration-isolation layer, and height of the one or more indicator components varies depending on thickness of the elastic vibration-isolation layer. The server is electrically coupled to an electronic device and configured to determine whether the elastic vibration-isolation layer of the cargo-carrying apparatus is invalid according to a compression ratio of the elastic vibration-isolation layer obtained from an indicator-component image of one of the one or more indicator components captured by the electronic device.

In yet another exemplary embodiment, a method for detecting failure of a cargo-carrying apparatus is provided. The method includes the steps of: providing a cargo-carrying apparatus, wherein the cargo-carrying apparatus comprises an upper deck and an elastic vibration-isolation layer disposed beneath the upper deck; disposing one or more indicator components on one or more side surfaces of the elastic vibration-isolation layer, wherein and height of the one or more indicator components varies depending on thickness of the elastic vibration-isolation layer; obtaining an indicator-component image of one of the one or more indicator components of the cargo-carrying apparatus; determining a compression ratio of the elastic vibration-isolation layer according to the indicator-component image; and determining whether the elastic vibration-isolation layer of the cargo-carrying apparatus is invalid according to the compression ratio.

BRIEF DESCRIPTION OF THE DRAWINGS

The disclosure can be more fully understood by reading the subsequent detailed description and examples with references made to the accompanying drawings, wherein:

FIGS. 4D-4E are diagrams of the indicator symbol of other types being compressed in accordance with another embodiment of the disclosure;

DETAILED DESCRIPTION OF THE DISCLOSURE

Figure 1:
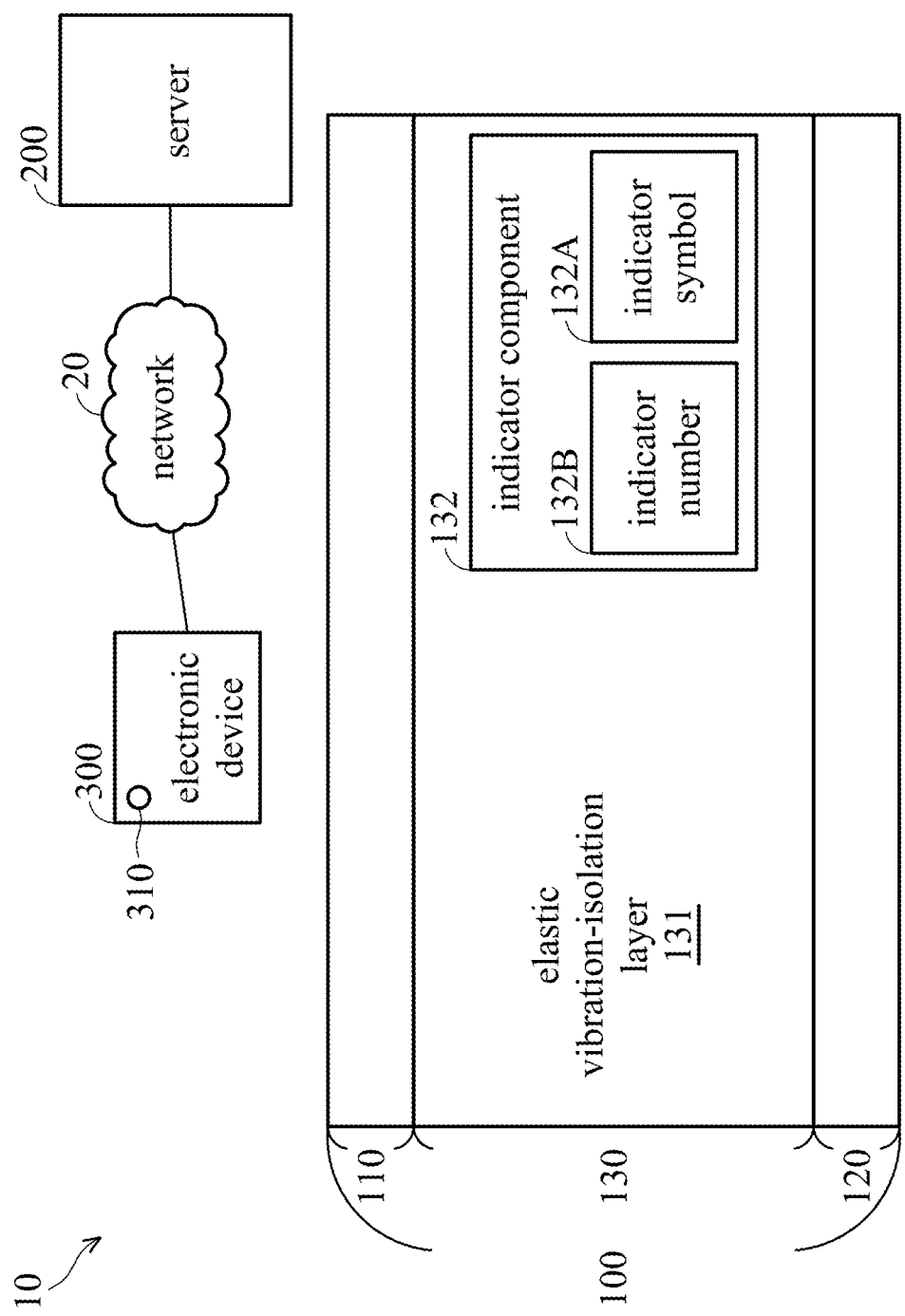
FIG. 1 is a block diagram of a cargo-carrying system in accordance with an embodiment of the disclosure.

The following description is made for the purpose of illustrating the general principles of the disclosure and should not be taken in a limiting sense. The scope of the disclosure is best determined by reference to the appended claims.

It is to be understood that the following disclosure provides one or more embodiments or examples to implement various features of the embodiments of the disclosure. The elements and arrangements of the specific examples disclosed below are intended to simplify the embodiments of the present disclosure and are not intended to be limited to the examples. In addition, the features in the drawings are not drawn to scale and are for illustrative purposes only.

FIG. 1 is a block diagram of a cargo-carrying system in accordance with an embodiment of the disclosure. In an embodiment, the cargo-carrying system 10 includes one or more cargo-carrying apparatus 100 and a server 200. The cargo-carrying apparatus 100 is configured to carry one or more units of cargo, and the cargo-carrying apparatus 100, for example, may be a reusable vibration-isolation pallet or cardboard, but the disclosure is not limited thereto. The server 200 may determine whether the vibration-isolation capability is invalid according to the status of the cargo-carrying apparatus 100. If it is determined that the vibration-isolation capability of the vibration-isolation pallet 100 is invalid, the server 200 may send a notification message to an electronic device 300 to indicate that the cargo-carrying apparatus 100 can no longer be used. If it is determined that the vibration-isolation capability of the vibration-isolation pallet 100 is not yet invalid, the server 200 may send a notification message to the electronic device 300 to indicate that the vibration-isolation pallet can be used to carry cargo. Details about determining whether the vibration-isolation capability of the cargo-carrying apparatus 100 by the server 200 will be described later.

In an embodiment, the electronic device 300 may be a personal computer or a portable electronic device (e.g., a smartphone, a tablet PC, or a laptop) equipped with a camera, that is connected to the server 200 via network 20 (e.g., a wired network or wireless network). The electronic device 300 may execute a management program (not shown) to capture an indicator-component image of the indicator component 132, and upload the captured indicator-component image to the server 200 for determination. In addition, the electronic device 300 may receive the determination result and associated information (e.g., the cargo-carrying-apparatus number, the number of shipments, the previous compression ratio of the cargo-carrying apparatus 100) from the server 200, and display corresponding information and options on its user interface.

For example, an operator at the factory end or the client may use the camera 310 of the electronic device 300 to capture the indicator component 132 on the cargo-carrying apparatus 100, and upload the captured indicator-component image to the server 200. The server 200 may determine whether the elastic vibration-isolation layer 131 of the cargo-carrying apparatus 100 is over-compressed (i.e., the vibration-isolation capability is lost) according to the indicator-component image of the indicator component 132 captured by the electronic device 300, and respond the determination result to the electronic device 300, thereby facilitating the user to perform corresponding treatment on the cargo-carrying apparatus 100 according to the above-mentioned determination result, such as using the cargo-carrying apparatus 100 to ship or discarding the cargo-carrying apparatus 100.

As depicted in FIG. 1, the cargo-carrying apparatus 100 includes an upper deck 110, a lower deck 120, and a vibration-isolation section 130. The upper deck 110 and the lower deck 120 may be configured in a stacked configuration or a nested configuration, and the vibration-isolation section 130 is disposed between the upper deck 110 and the lower deck 120 for vibration isolation. In an embodiment, the upper deck 110 and the lower deck 120 are sized to conform to ISO standard No. 6780, and the width×length may be, for example, 1000×1200 mm and 1100×1100 mm, but the disclosure is not limited thereto. In some embodiments, the upper deck 110 and the lower deck 120 may include a plurality of securing holes (not shown in FIG. 1) that can be used with the cords to secure the cargo carried by the cargo-carrying apparatus 100. In some embodiments, the cargo-carrying apparatus 100 may include only the upper deck 110 and the vibration-isolation section 130, or only the lower deck 120 and the vibration-isolation section 130, but the disclosure is not limited thereto.

The vibration-isolation section 130 includes an elastic vibration-isolation layer 131 and one or more indicator component 132. The elastic vibration-isolation layer 131, for example, can be implemented by elastic vibration-isolation materials and/or elastic vibration-isolation devices. For example, the elastic vibration-isolation materials may be rubber, sponge, carton, air bag, soft wood, ABS rubber resin, other types of elastic vibration-isolation materials, or a combination of elastic vibration-isolation materials. The elastic vibration-isolation devices, for example, may be rubber vibration-isolation devices or metal vibration-isolation devices (e.g. a spring vibration-isolation device). In another embodiment, the elastic vibration-isolation layer 131 may be implemented by a combination of an elastic vibration-isolation material and an elastic vibration-isolation device, but the disclosure is not limited thereto.

In an embodiment, the cargo-carrying apparatus 100 is configured to carry one or more units of cargo, and the cargo is disposed on the upper deck 110. During the transportation of the cargo, the elasticity of the elastic vibration-isolation layer 131 is gradually lowered due to the loss. If the weight of the cargo is quite heavy (e.g., a computer cabinet, a precision instrument, or other heavy objects), the degree of loss of the elastic vibration-isolation layer 131 is also increased. That is, the vibration-absorption capability of the elastic vibration-isolation layer 131 is gradually lowered, so that the object may be damaged during transportation of the cargo. Although the cargo-carrying apparatus 100 can be reused, in response to the elasticity of the vibration-isolation layer 131 being lowered to a certain extent, it can be considered that the vibration-isolation layer 131 has been over-compressed and lose its vibration-isolation capability. In addition, for the cargo-carrying apparatus 100 carrying the precision instrument, since a specific vibration-isolation design is required and the cost of the cargo-carrying apparatus 100 accounts for a considerable proportion of the cost of the cargo, it is a crucial topic to recycle the vibration-isolation pallet and reuse it under the premise of ensuring the vibration-isolation capability.

The indicator component 132 is disposed on a side surface of the elastic vibration-isolation layer 131, and covers the entire thickness or a predetermined range of the elastic vibration-isolation layer 132 to indicate the degree of compression of the elastic vibration-isolation layer 131 and the cargo-carrying-apparatus number of the cargo-carrying apparatus 100. For example, when the cargo-carrying apparatus 100 is just shipped from the factory, it indicates that the cargo-carrying apparatus 100 has not been used to carry cargo, that is, the elastic vibration-isolation layer 131 has optimal elasticity and thickest thickness at this time. In an embodiment, the thickness of the elastic vibration-isolation layer 131 is X1 when the cargo-carrying apparatus 100 is shipped from the factory and does not carry any cargo. The thickness of the elastic vibration-isolation layer 131 is X2 after the cargo-carrying apparatus 100 has passed through one or more transportation processes and does not carry any cargo. Since the elasticity of the elastic vibration-isolation layer 131 may be lowered after one or more transportation processes, the thickness X2 is smaller than the thickness X1. Assuming that the thickness of the elastic vibration-isolation layer 131 is uniformly linearly compressed to some extent after passing through the transportation process, the compression ratio CP (or the amount of compression) of the elastic vibration-isolation layer 131 can be calculated by equation (1):

$$CP=(X1-X2)/X1 \qquad (1)$$

For example, a predetermined threshold (e.g., 30%) of the compression ratio CP can be set in the server 200 in advance. When the server 200 determines that the compression ratio CP of the thickness of the elastic vibration-isolation layer 131 is greater than or equal to the predetermined threshold, the server 200 may determine that the elastic vibration-isolation layer 131 has lost its vibration-isolation capability. Thus, the server 200 may send a notification message to the electronic device 300 to indicate that the cargo-carrying apparatus 100 can no longer be used.

In an embodiment, the indicator component 132, for example, may include an indicator symbol 132A and an indicator number 132B (e.g., the cargo-carrying-apparatus number of the cargo-carrying apparatus 100). The indicator component 132 can be implemented by a sticker printed with the indicator symbol 132A and the indicator number 132B, and can be attached on one or more specific locations of the elastic vibration-isolation layer 131. In another embodiment, the indicator component 132 can be implemented by printing the indicator symbol 132A and the indicator number 132B on one or more specific locations of the elastic vibration-isolation layer 131. For example, the aforementioned one or more specific locations may be the left-side terminal, right-side terminal, or the center of one of the side surfaces of the elastic vibration-isolation layer 131, or one of the terminals (e.g., right-side terminal or left-side terminal) or the center of each of the four side surfaces of the elastic vibration-isolation layer 131.

Figure 2A:
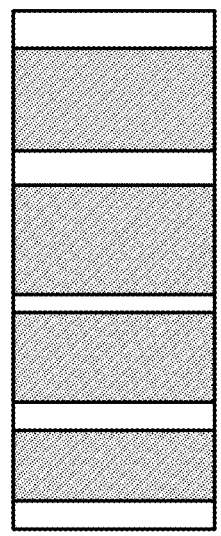
FIGS. 2A-2E are diagrams of different indicator symbols in accordance with an embodiment of the disclosure.
Figure 2B:
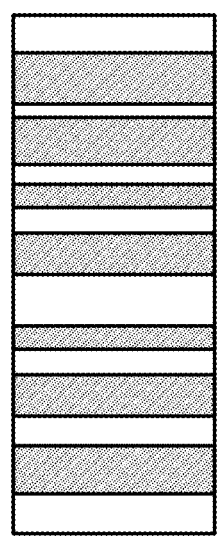
Figure 2C:
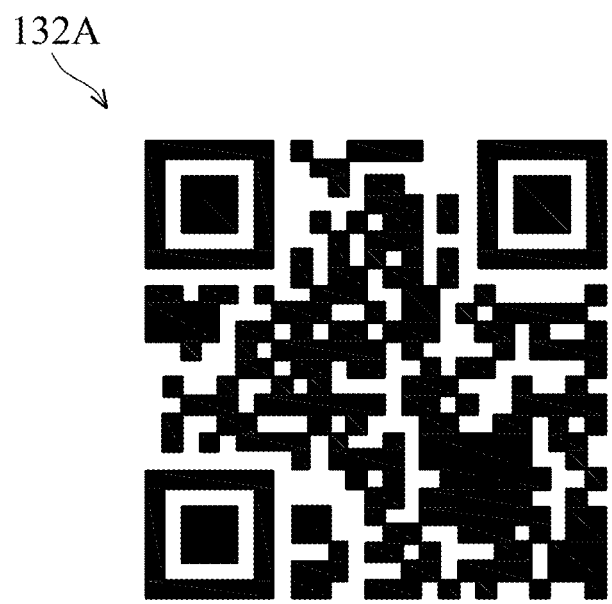
Figure 2D:
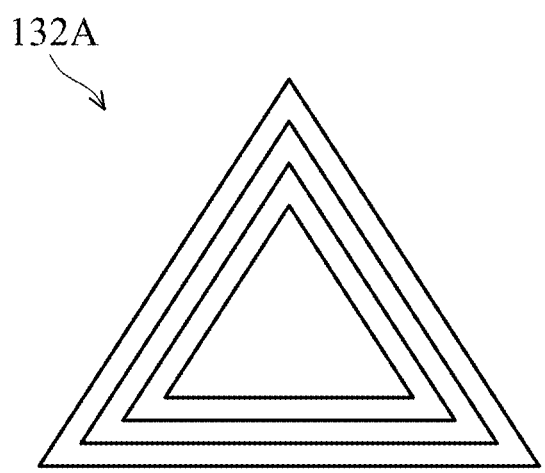
Figure 2E:
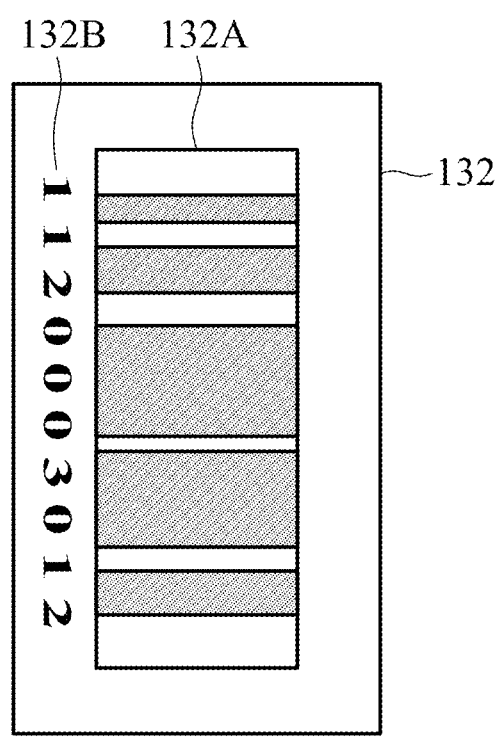

The indicator symbol 132A, for example, may be a one-dimensional bar code (e.g., shown in FIG. 2A and FIG. 2B), a two-dimensional bar code (e.g., shown in FIG. 2C), or a specially-designed symbol of different shapes (e.g., the triangular symbol shown in FIG. 2D), but the disclosure is not limited thereto. In an embodiment, the indicator symbol 132A of the indicator component 132 can be designed with respect to different materials of the elastic vibration-isolation layer 131. For example, if the elastic vibration-isolation layer 131 is implemented by a low-volume 2.2 LB foam (i.e., soft foam), it indicates that the elastic vibration-isolation layer 131 is relatively easy to be compressed, so that the thick stripe as shown in FIG. 2A can be used to facilitate determining the compression ratio CP. If the elastic vibration-isolation layer 131 is implemented by a high-volume 9 LB foam (i.e., hard foam), it indicates that the elastic vibration-isolation layer 131 is less likely to be compressed, so that the fine stripe shown in FIG. 2B can be used to facilitate determining the compression ratio CP. If the elastic vibration-isolation layer 131 is implemented by rubber, carton, air bag, soft wood, or ABS rubber resin, etc., appropriate signs may be selected according to practical conditions, and the disclosure is not limited to the indicator symbols or signs shown in FIGS. 2B-2D. In addition, in an embodiment, the indicator number 132B is drawn next to the indicator symbol 132A, and generally uses a larger font. As shown in FIG. 2E, the indicator component 132 includes the indicator symbol 132A (e.g., a one-dimensional bar code) and the corresponding indicator number 132B (e.g., the cargo-carrying-apparatus number of the cargo-carrying apparatus 100), but the disclosure is not limited thereto. Accordingly, it is possible to prevent the server 200 from being incapable of recognizing or erroneously recognizing the compressed character string of the indicator number 132B in the indicator-component image. It should be noted that the string in the indicator symbol 132B does not indicate the content to be expressed by the indicator symbol 132A.

Figure 3:
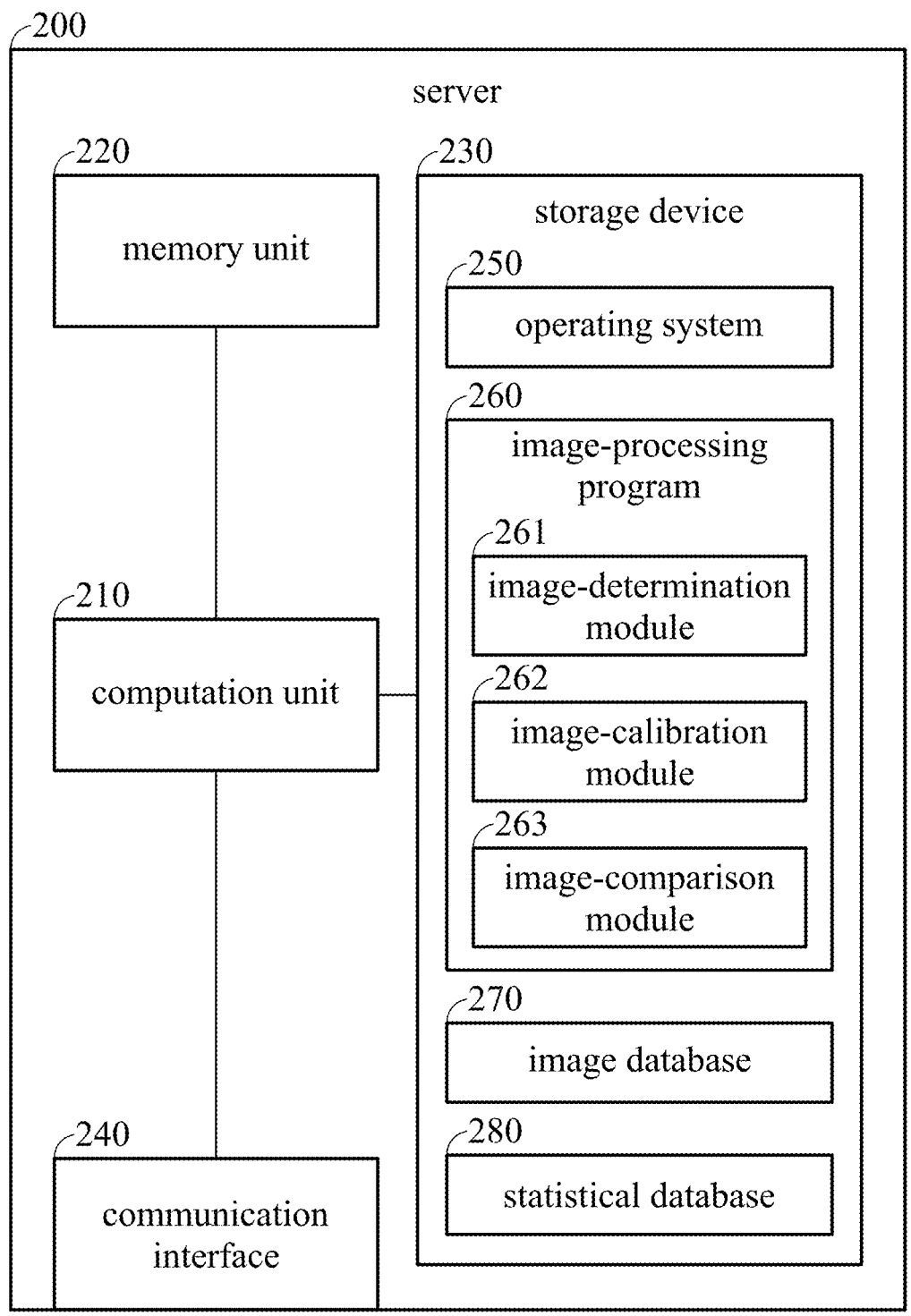
FIG. 3 is a block diagram of a server in accordance with an embodiment of the disclosure.

FIG. 3 is a block diagram of a server in accordance with an embodiment of the disclosure. In an embodiment, the server 200, for example, may be a personal computer, a cloud server, or a data center. The server 200 may include a computation unit 210, a memory unit 220, a storage device 230, and a communication interface 240. The computation unit 210 can be practiced in various ways, such as with dedicated hardware, or with general-purpose hardware (e.g., a single processor, multiple processors, or processors capable of parallel computations, etc.) that can be implemented by a central processing unit, a general-purpose processor, or a microcontroller, but the disclosure is not limited thereto.

The storage device 230, for example, may be a non-volatile memory such as a hard disk drive, a solid-state disk, or a read-only memory, but the disclosure is not limited thereto. The storage device 230 is configured to store an operating system 250 (e.g., Windows, Mac, Unix, or Linux) for operating the server 200, an image-processing program 260, and an image database, wherein the image-processing program 260 is configured to process the indicator-component image captured by the electronic device 300. The image-processing program 260, for example, may include an image-determination module 261, an image-calibration module 262, and an image-comparison module 263, and the details will be described later.

The memory unit 220, for example, may be a volatile memory such as a static random access memory or a dynamic random access memory, but the disclosure is not limited thereto. The memory unit 220 can be used as an execution space of the image-processing program 260 and a storage space for intermediate data or images generated by the image-processing program 260.

The communication interface 240, for example, may include a wired communication interface and/or a wireless communication interface, and the electronic device 300 can be connected to the server 200 via the communication interface 240 through a wired network or wireless network.

In an embodiment, the image database 270 may record indicator-component images (i.e., reference images) in different compression ratios of the elastic vibration-isolation layer 131 of different materials. For example, the user may select an option corresponding to the material of the elastic vibration-isolation layer 131 of the cargo-carrying apparatus 100 on the user interface of the electronic device 300, thereby informing the server 200 to use the reference images in the image database 270 corresponding to the selected material.

In an embodiment, the reference images stored in the image database 270, for example, may include a plurality of indicator-component images that are shoot in different compression ratios (e.g., 0%, 1%, 2%, . . . , 50%, not limited) of the same elastic vibration-isolation layer 131. In addition, the image database 270 may also record reference images in different compression ratios of the elastic vibration-isolation layer 131 made by different materials or composite materials. For example, the cargo-carrying apparatus 100 can be placed in a box compressor, and the uncompressed indicator component 132 of the cargo-carrying apparatus 100 is shot with a predetermined shooting condition (e.g., a fixed shooting distance and angle). Thus, the indicator-component image obtained at this time is the reference image corresponding to the compression ratio of 0%. Then, the box compressor is controlled to apply pressure to the cargo-carrying apparatus 100, so that the compression ratio of the elastic vibration-isolation layer 131 is gradually increased, and a camera can be used to capture the indicator-component images in different compression ratios of the elastic vibration-isolation layer 131 that are used as the reference images for different compression ratios.

In another embodiment, the reference images stored in the image database 270, for example, may include a plurality of indicator-component images that are shoot in some specific compression ratios of the same elastic vibration-isolation layer 131, wherein the specific compression ratios may be 0%, 10%, 20%, 30%, and so forth. The reference image for a particular compression ratio between two neighboring specific compression ratios can be calculated using the references images corresponding to these two neighboring specific compression ratios. For example, the reference image for the compression ratio of 12% can be interpolated using the reference images corresponding to the compression ratios of 10% and 20%.

Figure 4A:
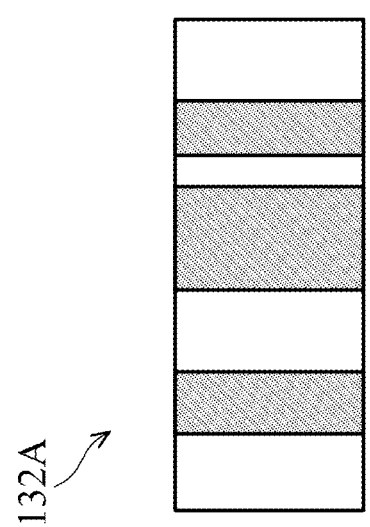
FIGS. 4A-4C are diagrams of the indicator symbol in different compression ratios in accordance with an embodiment of the disclosure.
Figure 4B:
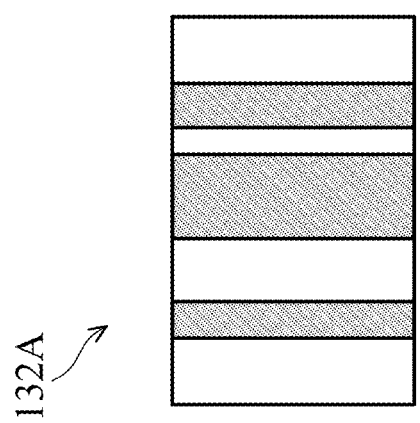
Figure 4C:
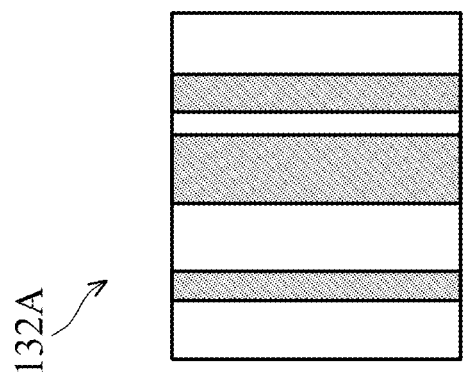

For example, given that the indicator symbol 132A is implemented by a one-dimensional bar code, when the cargo-carrying apparatus 100 is shipped from the factory, the elastic vibration-isolation layer 131 of the cargo-carrying apparatus 100 has not been used yet. Thus, if the electronic device 300 is used to capture an image of the indicator component 132, the captured indicator-component image may be shown in FIG. 4A. If the compression ratio of the elastic vibration-isolation layer 131 is 10%, the indicator symbol 132A may change to the one-dimensional bar code shown in FIG. 4B. If the compression ratio of the elastic vibration-isolation layer 131 is 30%, the indicator symbol 132A may change to the one-dimensional bar code shown in FIG. 4C. Accordingly, referring to FIGS. 4A-4C, during the procedure to change the compression ratio of the elastic vibration-isolation layer 131 from 0% to 30%, the aspect ratio and the black-and-white stripe pitch in the indicator-component image of the indicator symbol 132A may also change accordingly.

Figure 4E:
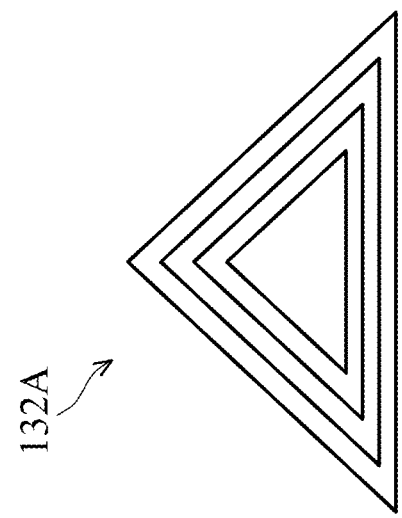
Figure 4E:
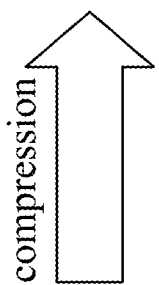
Figure 4E:
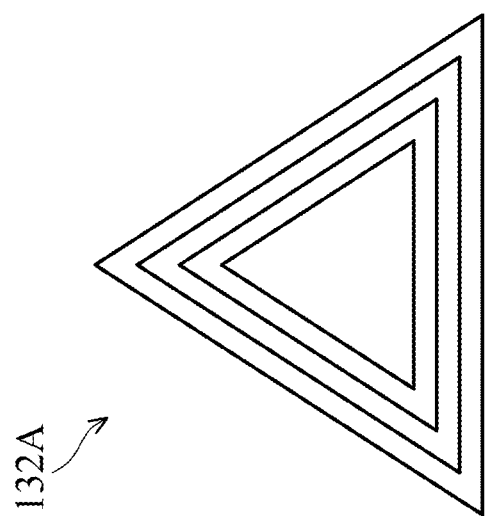

If the indicator symbol 132A is implemented by the QR code in the left portion of FIG. 4D and the elastic vibration-isolation layer 131 is compressed to a specific compression ratio, the QR code in the right portion of FIG. 4D can be obtained. If the indicator symbol 132A is implemented by the triangle symbol in the left portion of FIG. 4E and the elastic vibration-isolation layer 131 is compressed to a specific compression ratio, the triangle symbol in the right portion of FIG. 4E can be obtained. Accordingly, referring to FIGS. 4D-4E, when the indicator symbols 132A of different types are used and the elastic vibration-isolation layer 131 is compressed to different compression ratios, the indicator-component image after compression can still be captured, so that a de-noise process and a conversion process to binary images can be applied to the indicator-component images, and the processed images are stored into the image database 270 as the reference images for different compression ratios.

In another embodiment, the elastic vibration-isolation layer 131 of the cargo-carrying apparatus 100 can be implemented by a combination of different materials or composite materials, wherein the elastic vibration-isolation layer 131 formed by each of the materials may correspond to a respective indicator symbol 132A. Then, the cargo-carrying apparatus 100 having the elastic vibration-isolation layer 131 made of different materials can be placed in the box compressor in a similar manner, to capture the indicator-component images in different compression ratios of the elastic vibration-isolation layer 131 made of different materials, and the captured indicator-component images can be used as the reference images of different compression ratios for different materials.

In yet another embodiment, the image database 270 may record gap information between the bar codes in different compression ratios of the elastic vibration-isolation layer 131 made of different materials. For example, if the electronic device 300 is a portable electronic device, the camera 310 can be used as an optical scanner. The electronic device 300 may recognize the gap information of the pattern of the indicator symbol 132A of the indicator component 132 using the indicator-component image captured by the camera 310, or alternatively, the electronic device 300 may recognize the gap information of the pattern of the indicator symbol 132A of the indicator component 132 using a scanner device (e.g., an optical scanner). Then, the electronic device 300 may transmit the recognized gap information of the indicator symbol 132A to the server 200, wherein the gap information, for example, can be transmitted to the server 200 in the format of the indicator-component image.

In an embodiment, after the electronic device 300 has uploaded the captured indicator-component image to the server 200, the server 200 may execute the image-processing program 260 to perform corresponding image processing and determination. For example, the computation unit 210 may first execute the program code of the image-determination module 261 to determine whether the uploaded indicator-component image is a qualified indicator-component image.

If the computation unit 210 determines that indicator component 132 (i.e., including the indicator symbol 132A and indicator number 132B) in the indicator-component image is blurred or not in a predetermined position, the computation unit 210 may send a notification signal to request the user to re-use the electronic device 300 to shoot the indicator component 132 and upload the updated indicator-component image. If the computation unit 210 determines that the indicator component 132 has a normal pattern (e.g., no skew, blurriness, or distortion), the computation unit 210 may temporarily store the indicator-component image to the memory unit 220. If the computation unit 210 determines that the indicator component 132 in the indicator-component image is skewed or distorted (e.g., the electronic device 300 is not facing toward the indicator symbol 132A while photographing), the computation unit 210 may further execute the program code of the image-calibration module 262 to perform an image-calibration process on the indicator component 132 in the indicator-component image, such as multiplying the pixels of the indicator component 132 in the indicator-component image with a transpose matrix to calibrate the image of the indicator component 132 to a normal pattern (i.e., a pattern without skewness or distortion), and temporarily store the calibrated indicator-component image to the memory unit 220. In some embodiments, the computation unit 210 may adjust the size of the calibrated indicator-component image to fit the size of the reference image, and temporarily store the adjusted indicator-component image to the memory unit 220.

The computation unit 210 may then execute the program code of the image-comparison module 263 to compare the partial image of the indicator symbol 132A in the indicator-component image temporarily stored in the memory unit 220 with the reference images of the same indicator symbol 132A in different compression ratios in the image data base 270, thereby determining the compression ratio of the indicator symbol 132A in the indicator-component image (e.g., obtaining the compression ratio of the reference image having the highest similarity). In addition, the computation unit 210 may recognize the numeric string represented by the indicator number 132B from the indicator-component image using optical-character recognition techniques or other image-recognition techniques to obtain the cargo-carrying-apparatus number of the cargo-carrying apparatus 100, and report the cargo-carrying-apparatus number of the cargo-carrying apparatus 100 and the determination result of the compression ratio to the electronic device 300. The electronic device 300 may record the information such as the cargo-carrying-apparatus number of the cargo-carrying apparatus 100, its compression ratio, and the corresponding determination result in the statistical database 280 for statistical purposes.

For example, a predetermined threshold for the compression ratio can be set in the server 200 in advance. When the computation unit 210 determines that the compression ratio of the thickness of the elastic vibration-isolation layer 131 is larger than or equal to the predetermined threshold, the computation unit 210 may determine that the elastic vibration-isolation layer 131 has lost its vibration-isolation capability. Thus, the computation unit 210 may send a notification message to the electronic device 300 to indicate that the cargo-carrying apparatus 100 can no longer be used, and the computation unit 210 may record the associated scrap information in the statistical database 280.

When the computation unit 210 determines that the compression ratio CP of the thickness of the elastic vibration-isolation layer 131 is smaller than the predetermined threshold, the computation unit 210 may determine that the vibration-isolation capability of the elastic vibration-isolation layer 131 is still valid, and thus the computation unit 210 may send a notification message to the electronic device 300 to indicate that the cargo-carrying apparatus 100 can be used to carry cargo for shipment, and record the shipment information in the statistical database 280. In some embodiments, when the computation unit 210 determines that the compression ratio CP of the thickness of the elastic vibration-isolation layer 131 is smaller than and relatively close to the predetermined threshold, the computation unit 210 may send a notification message to the electronic device 300 to prompt the corresponding compression ratio CP and the cargo-carrying apparatus 100 can be used to carry the cargo for shipment, and record the relevant shipment information and the compression ratio CP in the statistical database 280.

Specifically, when the computation unit 210 executes the program code of the image-comparison module 263 to compare the indicator-component image temporarily stored in the memory unit 220 with the reference images stored in the image database 270, the computation unit 210 may first perform a de-noise process on the indicator-component image, and convert the de-noised indicator-component image to a binary image, thereby facilitating recognizing the gap-distance information between pixels or stripes in the pattern of the indicator symbol 132A and the indicator number 132B in the binary image. The gap-distance information, for example, may be a sequence of a plurality of black stripe width values and white interval width values, and the black stripe width value refers to the width of the black stripe (i.e., the number of consecutive black pixels), and the white interval width value refers to the width of the white interval (i.e., the number of consecutive white pixels).

The computation unit 210 may start the image-comparison process using the reference image corresponding to the compression ratio of 0% in the image database 270, such as calculating the reference gap-distance information of the pixels or stripes of the pattern in the reference image, thereby determining whether the gap-distance information of the indicator symbol 132A in the indicator-component image received by the server 200 is similar to the reference gap-distance information in the reference image corresponding to the compression ratio of 0%. For example, in response to the difference between the black stripe width values and white interval width values in the gap-distance information in the indicator-component image and the reference gap-distance information in the reference image being smaller than a predetermined ratio, the computation unit 210 may determine that the gap-distance information in the indicator-component image is similar to the reference gap-distance information in the reference image.

If the gap-distance information of the indicator symbol 132A in the indicator-component image received by the server 200 is not similar to gap-distance information in the reference image corresponding to the compression ratio of 0%, the computation unit 210 may sequentially compare the reference images with different compression ratios (e.g., sequentially incremented from 1%) with the indicator-component image until the reference image having a specific compression ratio is similar to the indicator-component image. However, because in some cases, the reference images with similar compression ratios may have similar reference gap-distance information, the computation unit 210 still needs to further determine the actual compression ratio of the indicator-component image.

Figure 5B:
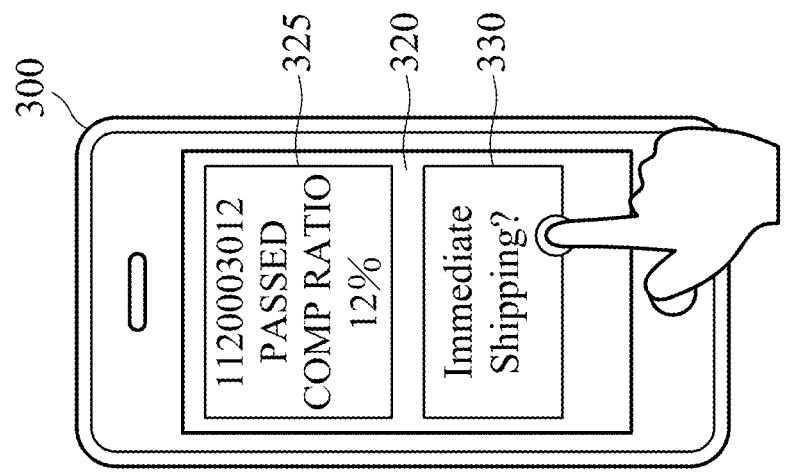
FIGS. 5A-5D are diagrams of the user interface for capturing the indicator-component image and receiving the reported message in accordance with an embodiment of the disclosure.
Figure 5A:
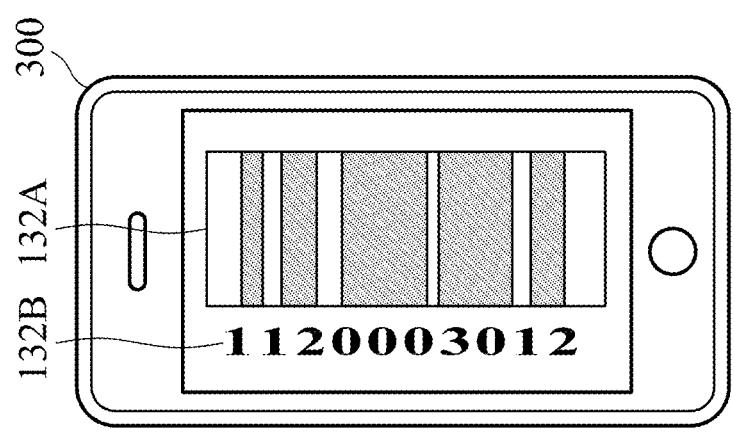

In an embodiment, the indicator-component image captured by the electronic device 300 is shown in FIG. 5A, and the indicator component 132 in the indicator-component image has been compressed (e.g., compression ratio of 12%). When the computation unit 210 continues the image-comparison process until the reference image having a first compression ratio (e.g., 10%) is similar to the indicator-component image, the computation unit 210 may continue to compare the reference image of the next compression ratio with the indicator-component image until the reference image with a second compression ratio (e.g., 13%) used by the computation unit 210 is not similar to the indicator-component image. Accordingly, the computation unit 210 may determine that the previous compression ratio of the second compression ratio (e.g., 12%) is the compression ratio of the indicator-component image.

Meanwhile, the computation unit 210 may determine that the compression ratio of 12% is smaller than the predetermined threshold (e.g., 30%), which indicates that the determination result is "passed". Since the computation unit 210 may also recognize the string represented by the indicator number 132B in the indicator-component image, such as the cargo-carrying-apparatus number 1120003012 of the cargo-carrying apparatus 100, while performing the image-comparison process, the computation unit 210 may transmit the determination result (e.g., "passed"), the compression ratio, the recognized cargo-carrying-apparatus number, the number of shipments, and the compression ratio of the previous shipment of the cargo-carrying apparatus 100 (e.g., stored in the statistical database 280) to the electronic device 300. Accordingly, the user interface 325 on the screen 320 of the electronic device 300 may show the determination result (e.g., "passed"), the compression ratio, and the recognized cargo-carrying-apparatus number of the cargo-carrying apparatus 100, as shown in FIG. 5B. In addition, the user may press the option 330 of the user interface 325 to use the cargo-carrying apparatus 100 with the cargo-carrying-apparatus number 1120003012 for the shipment. Meanwhile, the electronic device 300 may increase the number of shipments of the cargo-carrying apparatus 100 with the cargo-carrying-apparatus number 1120003012 by 1, and report the cargo-carrying-apparatus number, the compression ratio, and the number of shipments of the cargo-carrying apparatus 100 to the server 200, and the server 200 may store the relevant records in the statistical database 280.

Figure 5D:
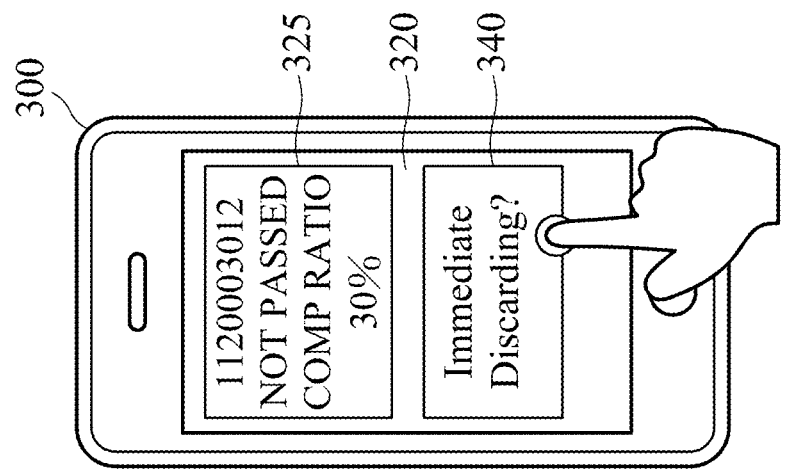
Figure 5C:
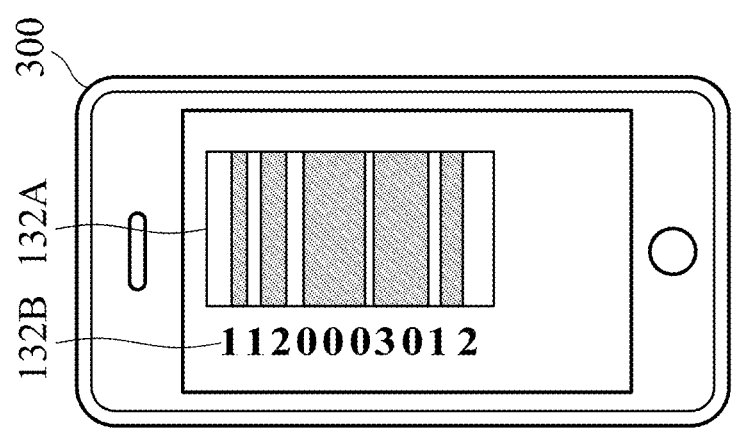

In another embodiment, the indicator-component image captured by the electronic device 300 is shown in FIG. 5C, and the indicator component 132 in the indicator-component image has been compressed (e.g., compression ratio of 30%). When the computation unit 210 continues the image-comparison process until the reference image having a first compression ratio (e.g., 29%) is similar to the indicator-component image, the computation unit 210 may continue to compare the reference image of the next compression ratio with the indicator-component image until the reference image with a second compression ratio (e.g., 31%) used by the computation unit 210 is not similar to the indicator-component image. Accordingly, the computation unit 210 may determine that the previous compression ratio of the second compression ratio (e.g., 30%) is the compression ratio of the indicator-component image.

Meanwhile, the computation unit 210 may determine that the compression ratio of 30% is equal to the predetermined threshold (e.g., 30%), which indicates that the determination result is "not passed". Since the computation unit 210 may also recognize the string represented by the indicator number 132B in the indicator-component image, such as the cargo-carrying-apparatus number 1120003012 of the cargo-carrying apparatus 100, while performing the image-comparison process, the computation unit 210 may transmit the determination result (e.g., "not passed"), the compression ratio, the recognized cargo-carrying-apparatus number, the number of shipments, and the compression ratio of the previous shipment of the cargo-carrying apparatus 100 (e.g., stored in the statistical database 280) to the electronic device 300. Accordingly, the user interface 325 on the screen 320 of the electronic device 300 may show the determination result (e.g., "not passed"), the compression ratio, and the recognized cargo-carrying-apparatus number of the cargo-carrying apparatus 100, as shown in FIG. 5D. In addition, the user may press the option 340 of the user interface 325 to immediately discard the cargo-carrying apparatus 100 with the cargo-carrying-apparatus number 1120003012. Meanwhile, the electronic device 300 may report the cargo-carrying-apparatus number, the compression ratio, and the discard status of the cargo-carrying apparatus 100 to the server 200, and the server 200 may store the relevant records in the statistical database 280.

Briefly, in the aforementioned embodiments, while performing the image-comparison process, the server 200 may determine that the highest compression ratio corresponding to the reference image that is similar to the indicator-component image is the compression ratio of the elastic vibration-isolation layer 131, and compare the determined compression ratio with the predetermined threshold, thereby generating the determination result about whether the elastic vibration-isolation layer 131 is invalid.

In the embodiments of FIGS. 5A-5D, the compression ratio of a single indicator component of the cargo-carrying apparatus 100 is used for determination. If the elastic vibration-isolation layer 131 of the cargo-carrying apparatus 100 is provided with corresponding indicator components 132 on different side surfaces for respectively indicating the compression ratio of the different side surfaces, the compression ratio of one of the indicator components can still be used for determination. Furthermore, the weight of the cargo carried by the cargo-carrying apparatus 100 is not uniformly applied to the elastic vibration-isolation layer 131, and thus the elastic vibration-isolation layer 131 is subjected to different degrees of force at different positions. Therefore, after the cargo-carrying apparatus has been transported, the compression ratios at different positions of the elastic vibration-isolation layer 131 may also be different.

Accordingly, in another embodiment, the server 200 may make a comprehensive determination based on the indicator-component images at different positions of the cargo-carrying apparatus 100 to determine whether the cargo-carrying apparatus 100 can still be used to carry cargo. For example, the user may select an option for comprehensive determination (not shown) on the user interface of the electronic device 300. Next, the electronic device 300 can be used to capture the indicator components 132 at different positions (e.g., four side surfaces) of the elastic vibration-isolation layer 131 of the cargo-carrying apparatus 100, and upload the captured indicator-component images to the server 200. Thus, there are four indicator-component image for different positions of the cargo-carrying apparatus 100 on the server 200.

Subsequently, the computation unit 210 may perform image determination, image calibration, and image comparison on each indicator-component image according to the flow described in the aforementioned embodiments, thereby obtaining the compression ratio corresponding to each indicator-component image, such as CP1, CP2, CP3, and CP4. Then, the computation unit 210 may compare each of the compression ratios CP1~CP4 with the predetermined threshold (e.g., 30%). If there are two or more compression ratios among the four compression ratios CP1~CP4 are larger than or equal to the predetermined threshold, the computation unit 210 may determine that the vibration-isolation capability of the elastic vibration-isolation layer 131 of the cargo-carrying apparatus 100 is lost, which indicates that the determination result is not passed. If there is none or one of the four compression ratios CP1~CP4 is larger than or equal to the predetermined threshold, the computation unit 210 may determine that the elastic vibration-isolation layer 131 of the cargo-carrying apparatus 100 has not yet lost its vibration-isolation capability, which indicates that the determination result is passed (i.e., a "pass"). Afterwards, the computation unit 210 may transmit relevant information to the electronic device 300 in a similar manner as the flow described in the embodiments of FIGS. 5A~5D, and the user may select a corresponding option according to the information displayed on the user interface of the electronic device 300, such as "immediate shipping" (option 330) or "immediate discarding" (option 340).

Figure 5G:
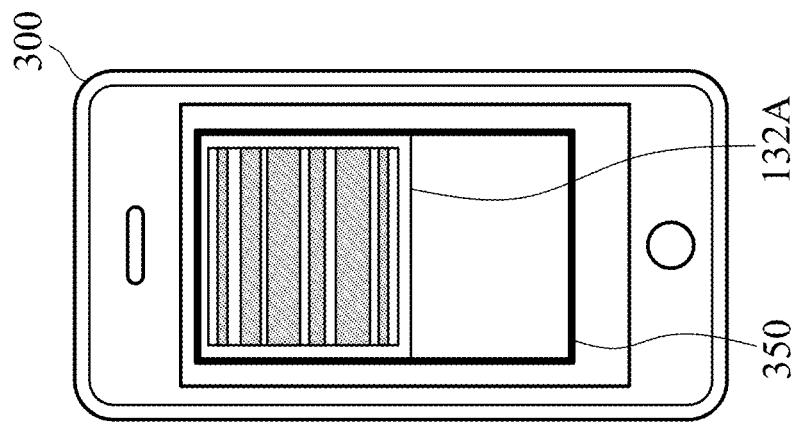
FIGS. 5F-5G are diagrams of capturing the indicator symbol in different compression ratios by the electronic device in accordance with another embodiment of the disclosure.
Figure 5F:
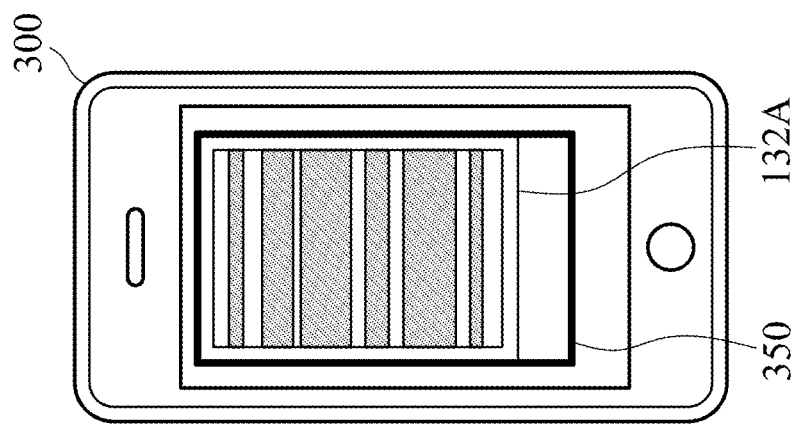
Figure 5E:
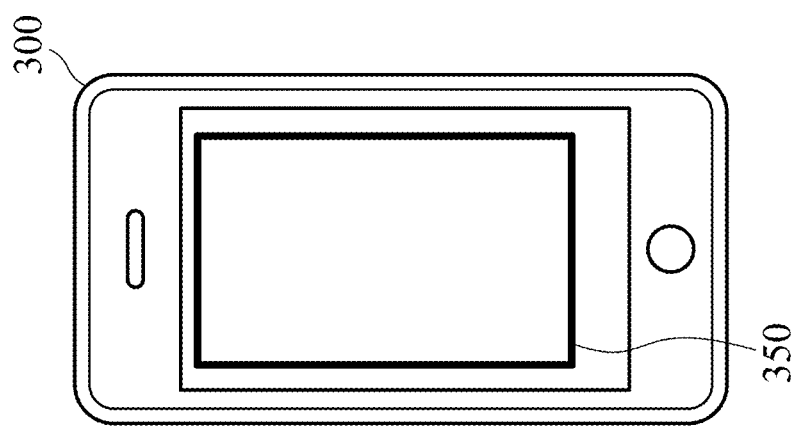
FIG. 5E is a diagram of a positioning frame of the user interface of the electronic device in accordance with another embodiment of the disclosure.

In an embodiment, a certain rule is required to use the electronic device 300 to capture the indicator component 132 on the elastic vibration-isolation layer 131, and thus the server 200 may have the same evaluation criteria to compare the indicator-component image with the reference images stored in the image database 270. For example, when the electronic device 300 is used to capture the indicator-component image, a positioning frame 350 is displayed on the electronic device 300, as shown in FIG. 5E. For example, the user has to adjust the distance between the electronic device 300 and the cargo-carrying apparatus 100 such that the outer frame of the indicator component 132 can be aligned with the inner edge of the upper, left, right, or lower frame of the positioning frame 350. Because of the elastic vibration-isolation layer 131 having different compression ratios, the height and width of the indicator component 132 on the elastic vibration-isolation layer 131 may also be different (e.g., referring to the embodiments of FIGS. 4A~4E), and thus a corresponding positioning point is required for capturing the indicator-component image. For purposes of description, only the indicator symbol 132A of the indicator component 132 is captured. In response to the compression ratio of the elastic vibration-isolation layer 131 being 0%, the height of the indicator symbol 132A is highest, as shown in FIG. 5F. In response to the compression ratio of the elastic vibration-isolation layer 131 being 30%, height of the indicator symbol 132A is lowered, as shown in FIG. 5G.

After the electronic device 300 has uploaded the captured indicator-component image to the server 200, the server 200 may determine the height and width corresponding to the indicator component 132 in the indicator-component image, and adjust the size of the indicator-component image to fit that of the reference image. Accordingly, the server 200 may compare the indicator-component image with the reference images stored in the image database 270 using the same evaluation criteria.

Figure 6:
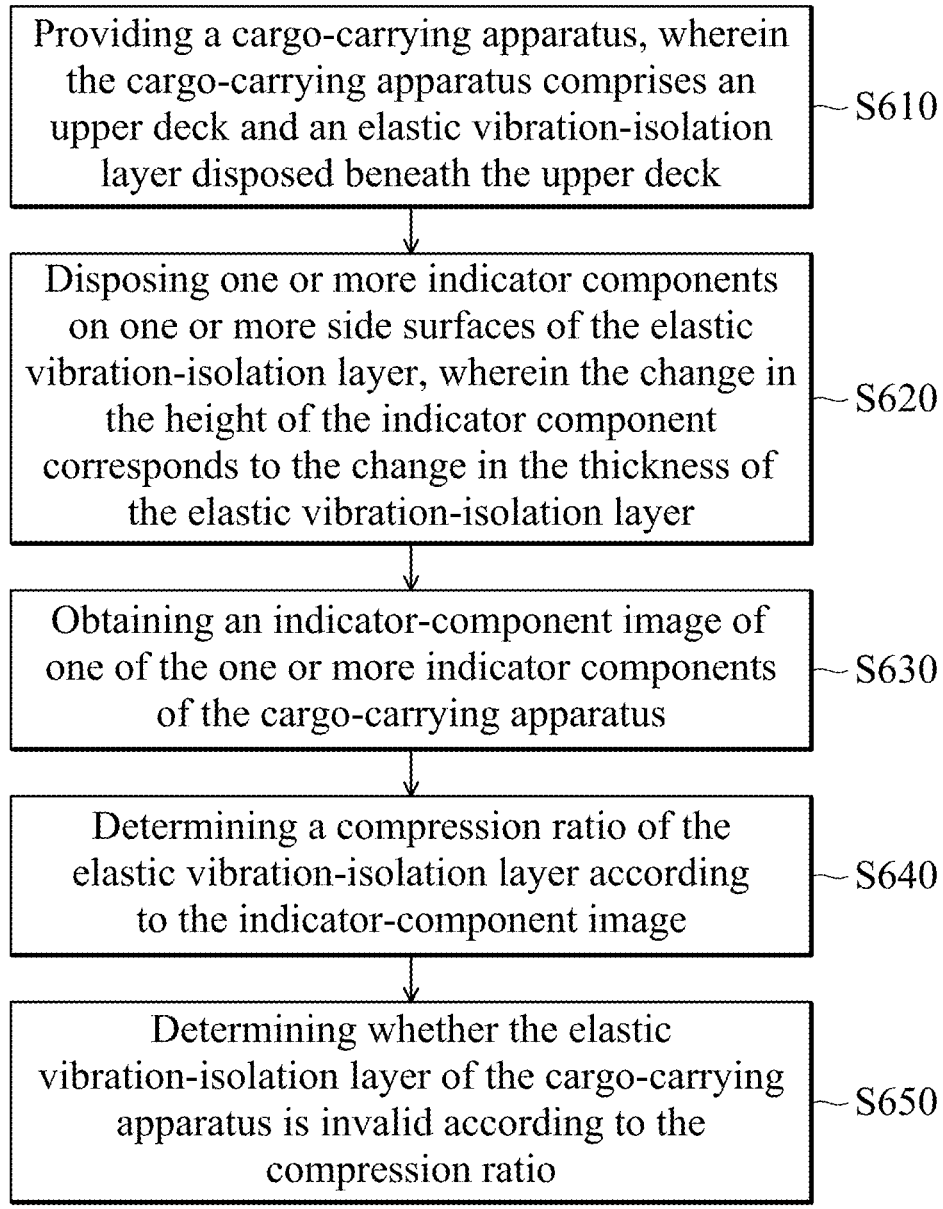
FIG. 6 is a flow chart of a method for detecting failure of a cargo-carrying apparatus in accordance with an embodiment of the disclosure.

FIG. 6 is a flow chart of a method for detecting failure of a cargo-carrying apparatus in accordance with an embodiment of the disclosure.

In step S610, a cargo-carrying apparatus 100 is provided, wherein the cargo-carrying apparatus 100 includes an upper deck 110, a lower deck 120, and an elastic vibration-isolation layer 131 disposed between the upper deck 110 and the lower deck 120.

In step S620, one or more indicator components 132 are disposed on one or more side surfaces of the elastic vibration-isolation layer 131, wherein the change in the height of the indicator component 132 corresponds to the change in the thickness of the elastic vibration-isolation layer 131. For example, an indicator component 132 can be respectively disposed on different side surfaces of the elastic vibration-isolation layer 131 to indicate the degree of compression at the respective side surfaces. If various indicator components 132 are disposed on different side surfaces of the elastic vibration-isolation layer 131, the indicator-component image of one of the indicator components 132 can be used alone to determine whether the elastic vibration-isolation layer 131 is invalid. Alternatively, the indicator-component images of the indicator components 132 disposed on different side surfaces of the elastic vibration-isolation layer 131 can be used to determine the compression ratios at different positions of the elastic vibration-isolation layer 131, and make a comprehensive determination whether the elastic vibration-isolation layer 131 is invalid using the compression ratios at different positions.

In step S630, an indicator-component image of one of the one or more indicator components 132 of the cargo-carrying apparatus 100 is obtained. After the cargo-carrying apparatus has undergone the transportation procedure, the thickness of the elastic vibration-isolation layer 131 will be lowered due to damage or fatigue. When the cargo-carrying apparatus 100 is to be used to carry cargo, it is necessary to determine whether the elastic vibration-isolation layer 131 is invalid according to the indicator-component image of the indicator component 132 of the cargo-carrying apparatus 100.

In step S640, a compression ratio of the elastic vibration-isolation layer 131 is determined according to the indicator-component image. For example, the server 200 may perform an image-determination process (e.g., the pattern of the indicator-component image is blurred or not at the predetermined position), an image-calibration process (e.g., if the indicator-component image is skewed or distorted), and an image-comparison process (e.g., comparing the indicator-component image with the reference images in the image database 270) on the indicator-component image. While performing the image-comparison process, the server 200 sequentially compares each of the reference images in the image database 270 with the indicator-component image temporarily stored in a volatile memory (e.g., memory unit 220) to determine whether each of the reference images is similar to the indicator-component image. The server 200 may decide the highest compression ratio corresponding to the reference images that are similar to the indicator-component image as the compression ratio of the elastic vibration-isolation layer 131, wherein the details for the image-comparison process can be referred to in the aforementioned embodiments.

In step S650, it is determined whether the elastic vibration-isolation layer 131 of the cargo-carrying apparatus 100 is invalid according to the determined compression ratio. For example, the server 200 may compare the determined compression ratio with a predetermined threshold. If the determined compression ratio is larger than or equal to the predetermined threshold, the server 200 may determine that the vibration-isolation capability of the elastic vibration-isolation layer 131 is invalid, which indicates that the determination result is not passed (i.e., a "failure"). If the determined compression ratio is smaller than the predetermined threshold, the server 200 may determine that the vibration-isolation capability of the elastic vibration-isolation layer 131 is valid, which indicates that the determination result is passed. The server 200 may further report the determination result and the recognized string represented by the indicator number 132B in the indicator-component image to the electronic device 300, and the electronic device 300 may display relevant information and options on the user interface according to the received content.

In view of the above, a cargo-carrying system, a cargo-carrying apparatus, and a method for detecting failure thereof are provided in the present disclosure, which are capable of disposing one or more indicator components on the side surfaces of the elastic vibration-isolation layer of the cargo-carrying apparatus, and the change of the height of the indicator component may correspond to the change of the thickness of the elastic vibration-isolation layer. The server may use objective evaluation criteria to compare the indicator-component image of the indicator component captured by the electronic device with the reference images in the image database, thereby determining whether the vibration-isolation capability of the elastic vibration-isolation layer of the cargo-carrying apparatus is invalid. Accordingly, for the reusable cargo-carrying apparatus, the cargo-carrying apparatus can be recycled and reused under the premise of ensuring the vibration-isolation capability.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A cargo-carrying apparatus, comprising:
   an upper deck, configured to carry a cargo; and
   a vibration-isolation section, disposed beneath the upper deck;
   wherein the vibration-isolation section comprises an elastic vibration-isolation layer and one or more indicator components, and the one or more indicator components are disposed on one or more side surfaces of the elastic vibration-isolation layer, and height of the one or more indicator components varies depending on thickness of the elastic vibration-isolation layer,
   wherein it is determined whether the elastic vibration-isolation layer of the cargo-carrying apparatus is invalid according to a compression ratio of the elastic vibration-isolation layer obtained from an indicator-component image of one of the one or more indicator components.

2. The cargo-carrying apparatus as claimed in claim 1, wherein each of the one or more indicator components comprises an indicator symbol and an indicator number, and a pattern of the indicator symbol corresponds to a material of the elastic vibration-isolation layer, and the indicator number indicates a cargo-carrying-apparatus number.

3. A cargo-carrying system, comprising:
   a cargo-carrying apparatus, comprising:
      an upper deck, configured to carry cargo; and
      a vibration-isolation section, disposed beneath the upper deck, wherein the vibration-isolation section comprises an elastic vibration-isolation layer and one or more indicator components, and the one or more indicator components are disposed on one or more side surfaces of the elastic vibration-isolation layer, and height of the one or more indicator components varies depending on thickness of the elastic vibration-isolation layer; and
   a server, electrically coupled to an electronic device, and configured to determine whether the elastic vibration-isolation layer of the cargo-carrying apparatus is invalid according to a compression ratio of the elastic vibration-isolation layer obtained from an indicator-component image of one of the one or more indicator components captured by the electronic device.

4. The cargo-carrying system as claimed in claim 3, wherein each of the one or more indicator components comprises an indicator symbol and an indicator number, and a pattern of the indicator symbol corresponds to a material of the elastic vibration-isolation layer, and the indicator number indicates a cargo-carrying-apparatus number.

5. The cargo-carrying system as claimed in claim 4, wherein the server comprises an image database which records a plurality of reference images of the elastic vibration-isolation layer in different compression ratios, and the server compares the indicator-component image with the reference images to determine the compression ratio of the elastic vibration-isolation layer.

6. The cargo-carrying system as claimed in claim 5, wherein while the server compares the indicator-component image with the reference images to determine the compression ratio of the elastic vibration-isolation layer, the server determines whether the pattern in the indicator-component image is blurred or not in a predetermined position,
   in response to the server determining that the pattern in the indicator-component image is not blurred or in the predetermined position, the server further determines whether the pattern in the indicator-component image is a normal pattern; and
   in response to the server determining that the pattern in the indicator-component image is blurred or not in the predetermined position, the server transmits a notification message to the electronic device to prompt to re-photograph the indicator component.

7. The cargo-carrying system as claimed in claim 6, wherein while the server determines whether the pattern in the indicator-component image is the normal pattern, the server performs an image-calibration process on the indicator-component image in response to the server determining that the pattern in the indicator-component image is not the normal pattern.

8. The cargo-carrying system as claimed in claim 5, wherein the server sequentially compares each of the reference images with the indicator-component image to determine whether the reference images are similar to the indicator-component image,
   wherein the server determines the highest compression ratio corresponding to the reference images that are similar to the indicator-component image as the compression ratio of the elastic vibration-isolation layer.

9. The cargo-carrying system as claimed in claim 4, wherein the server further recognizes the cargo-carrying-apparatus number represented by the indicator symbol from the indicator-component image, and reports the cargo-carrying-apparatus number and a determination result indicating whether the elastic vibration-isolation layer is invalid to the electronic device.

10. The cargo-carrying system as claimed in claim 9, wherein the server comprises a statistical database which records the determination result corresponding to the cargo-carrying-apparatus number.

11. The cargo-carrying system as claimed in claim 3, wherein the server further determines the compression ratios at different positions of the elastic vibration-isolation layer from the indicator-component image corresponding to each of the one or more indicator components,
    wherein in response to half or more of the compression ratios at different positions being larger than or equal to a predetermined threshold, the server determines that the cargo-carrying apparatus is invalid.

12. A method for detecting failure of a cargo-carrying apparatus, comprising:
    providing a cargo-carrying apparatus, wherein the cargo-carrying apparatus comprises an upper deck and an elastic vibration-isolation layer disposed beneath the upper deck;
    disposing one or more indicator components on one or more side surfaces of the elastic vibration-isolation layer, wherein height of the one or more indicator components varies depending on thickness of the elastic vibration-isolation layer;

obtaining an indicator-component image of one of the one or more indicator components of the cargo-carrying apparatus;

determining a compression ratio of the elastic vibration-isolation layer according to the indicator-component image; and determining whether the elastic vibration-isolation layer of the cargo-carrying apparatus is invalid according to the compression ratio.

13. The method as claimed in claim 12, wherein each of the one or more indicator components comprises an indicator symbol and an indicator number, and a pattern of the indicator symbol corresponds to a material of the elastic vibration-isolation layer, and the indicator number indicates a cargo-carrying-apparatus number.

14. The method as claimed in claim 13, wherein the step of determining the compression ratio of the elastic vibration-isolation layer comprises:

providing an image database which records a plurality of reference images of the elastic vibration-isolation layer in different compression ratios; and comparing the indicator-component image with the reference images to determine the compression ratio of the elastic vibration-isolation layer.

15. The method as claimed in claim 14, wherein the step of comparing the indicator-component image with the reference images to determine the compression ratio of the elastic vibration-isolation layer comprises:

determining whether the pattern in the indicator-component image is blurred or not in a predetermined position;

in response to determining that the pattern in the indicator-component image is not blurred or in the predetermined position, determining whether the pattern in the indicator-component image is a normal pattern; and in response to determining that the pattern in the indicator-component image is blurred or not in the predetermined position, transmitting a notification message to the electronic device to prompt to re-photograph the indicator component.

16. The method as claimed in claim 15, wherein the step of determining whether the pattern in the indicator-component image is the normal pattern comprises:

performing an image-calibration process on the indicator-component image in response to the server determining that the pattern in the indicator-component image is not the normal pattern.

17. The method as claimed in claim 14, wherein the step of comparing the indicator-component image with the reference images to determine the compression ratio of the elastic vibration-isolation layer comprises:

sequentially comparing each of the reference images with the indicator-component image to determine whether the reference images are similar to the indicator-component image; and determining the highest compression ratio corresponding to the reference images that are similar to the indicator-component image as the compression ratio of the elastic vibration-isolation layer.

18. The method as claimed in claim 13, further comprising:

recognizing the cargo-carrying-apparatus number represented by the indicator symbol from the indicator-component image; and reporting the cargo-carrying-apparatus number and a determination result indicating whether the elastic vibration-isolation layer is invalid to the electronic device.

19. The method as claimed in claim 18, further comprising:

providing a statistical database; and storing the determination result corresponding to the cargo-carrying-apparatus number in the statistical database.

20. The method as claimed in claim 12, wherein the step of determining whether the elastic vibration-isolation layer is invalid according to the compression ratio comprises:

determining the compression ratios at different positions of the elastic vibration-isolation layer from the indicator-component image corresponding to each of the one or more indicator components;

in response to half or more of the compression ratios at different positions being larger than or equal to a predetermined threshold, determining that the cargo-carrying apparatus is invalid.

* * * * *